UNITED STATES PATENT OFFICE.

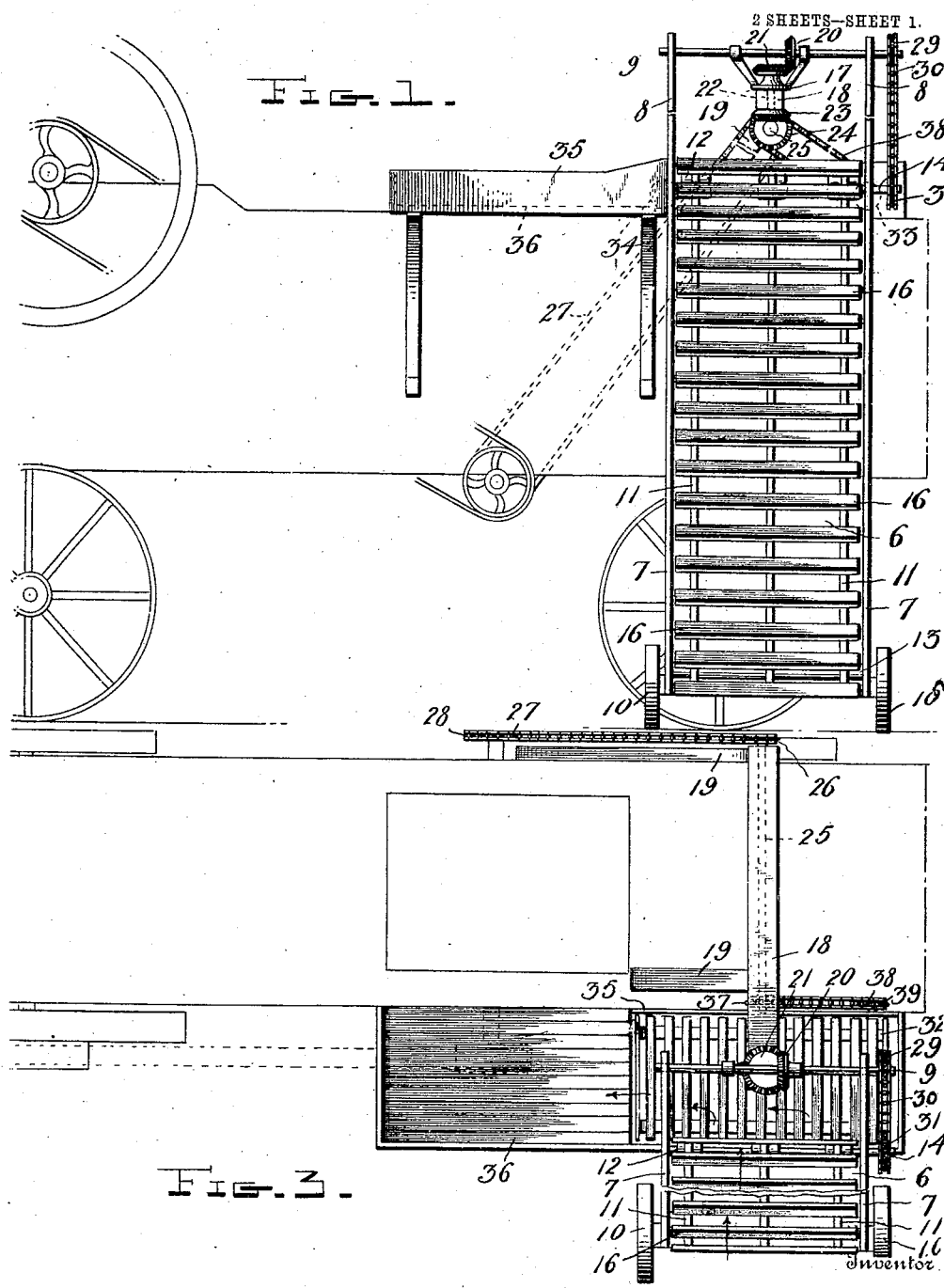

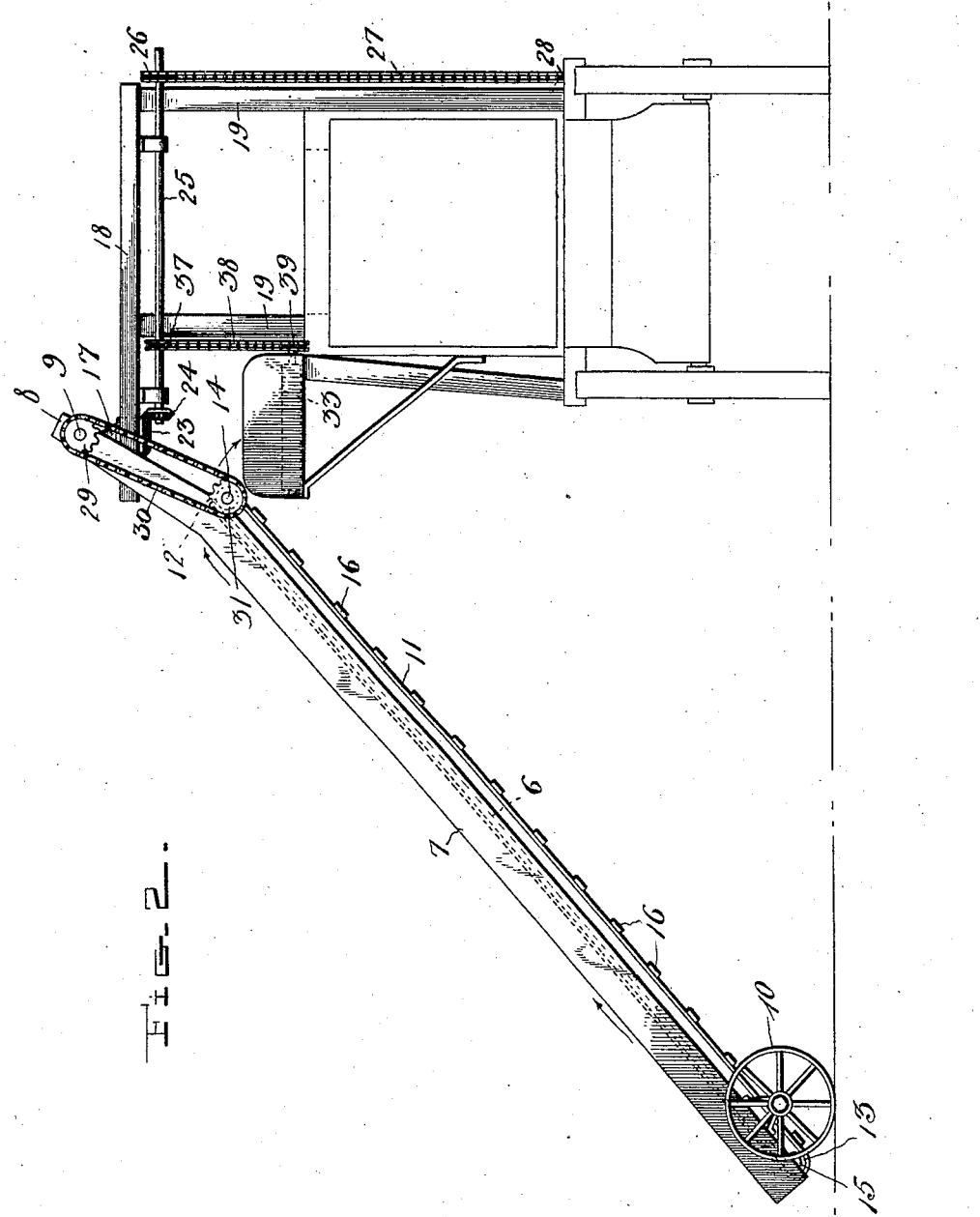

EDWARD RHODOVI, OF STANFORD, ILLINOIS.

BALING-PRESS.

No. 855,669.　　　Specification of Letters Patent.　　　Patented June 4, 1907.

Application filed November 15, 1906. Serial No. 343,524.

*To all whom it may concern:*

Be it known that I, EDWARD RHODOVI, a citizen of the United States, residing at Stanford, in the county of McLean and State of Illinois, have invented new and useful Improvements in Baling-Presses, of which the following is a specification.

This invention is an apparatus for carrying or feeding material such as hay or straw to a baling machine, and includes an endless belt elevator which is driven from the driving devices of the baler and which serves to elevate the material and deposit the same at or on the feeding table.

An important feature of the invention is that the elevator is pivotally carried so that it can be swung around in any direction or angle with respect to the baling machine. So the machine can be set at the center of a curved stack and the elevator turned around as the work progresses so that the whole stack can be baled without shifting the machine as heretofore.

The invention saves the labor of several men hitherto essential to pitch the material onto the baling press in position to be fed therein.

The invention is illustrated in the accompanying drawings, in which

Figure 1 is a side elevation of a baling press provided with the apparatus. Fig. 2 is an end view of the press, showing the conveyer or elevator in side elevation. Fig. 3 is a top plan view.

The baling press may be of any suitable or ordinary kind and no description of its parts is considered necessary further than is hereinafter mentioned. It is preferably a machine of the plunger type driven by a power which can be communicated to the elevating and conveying devices invented by me. Said devices include an inclined platform 6, having sides 7 from the upper ends of which project supporting arms 8 which carry a cross shaft 9. The lower end of the platform is mounted upon low wheels 10, and extending lengthwise around the platform, at each side thereof, are belts 11 which run over rollers 12 and 13 on shafts 14 and 15 at the opposite ends of the platform. These belts are connected by cross slats 16 which serve to convey and elevate the hay or other material and discharge the same at the upper end.

The shaft 9 is carried in bearings on a swivel 17 at the middle of the shaft, said swivel being rotatable upon the projecting outer end of a cross beam 18 supported above the machine by inclined braces 19 mounted on the main parts or frame of the baling press.

The shaft 9 has a bevel gear 20 between the arms of the swivel, which meshes with a bevel gear 21 on a pivot shaft 22 which extend vertically through the center of the swivel 17 and through the end of the beam 18 and is provided thereunder with a bevel gear 23 which meshes with a bevel gear 24 on the end of a shaft 25 which is carried in hangers under the beam 18 and which has a sprocket wheel 26 at its other end driven by a chain belt 27 from a sprocket 28 on one of the shafts of the baling press, which receives its power from the driving devices of the baling press.

The shaft 9 drives the belts 11 by means of sprocket wheel 29 on the end of the shaft 9, belt 30, and sprocket wheel 31 on the end of the shaft 14.

Supported upon the side of the baling press, in position to receive material from the elevator above described, is a short endless belt or apron 32 which extends around rollers 33 and 34 at its opposite ends and which travels between side pieces 35 and 36 and delivers the material to the feed table 36 whence it is fed into the baling chamber of the press. Said short conveyer 32 is driven from the shaft 25 by a sprocket 37 on said shaft, chain 38, and sprocket 39 on the roller 33.

In operation, the material is pitched onto the inclined elevator at the bottom thereof and is conveyed thereby and discharged onto the short conveyer 32 which carries it to the feed table. Hence no high pitching is necessary, nor is it necessary to carry the hay or straw to the side of the machine. The material can be pitched onto the elevator from some little distance. Furthermore, the elevator by means of its swiveling connection with the end of the beam 18 can be swung around at any angle with respect to the side of the baling press, and in any position in which it may be placed it will discharge the material onto the short conveyer 32. When the baling press is being hauled from one place to another the elevator will travel upon its wheels behind or beside the same, without disconnection. In shifting or adjusting the elevator to different angles it is not necessary to stop the machine, since the swivel connections of the gears allows the elevator to be turned while the press is in operation.

In working upon semi-circular or long stacks it is unnecessary to shift the machine, as heretofore, since the elevator can be swung around to reach all parts of the stack.

I claim:

1. The combination with a baling press, having a support extending outwardly over the top thereof, a feed table at the side of the press, and a conveyer leading to said table, of a conveyer pivoted to the outer end of said support, to swing horizontally to various angles with respect to the press, and means to operate the conveyer, to deliver material to the first-mentioned conveyer.

2. The combination with a baling press, having a support extending outwardly over the side thereof, a feed table at the side of the press, and a conveyer running lengthwise of the press under said support and leading to the table, of an elevating conveyer having a frame the inner end of which is pivotally mounted upon said support, over the aforesaid conveyer, and transmission gearing between the press and the conveyers.

3. The combination with a baling press having a feed table thereon, of a conveyer extending horizontally along the side of the press and leading to the table, an inclined conveyer the upper end of which is supported above the said conveyer and the lower end of which extends toward the ground, and means to operate said conveyers.

In testimony whereof I have signed my name to this specification in the presence of two subscribing witnesses.

EDWARD RHODOVI.

Witnesses:
HENRY KAUFFMAN,
OLIVER S. SKINNER.